(12) United States Patent
Adachi (10) Patent No.: US 9,124,022 B2
(45) Date of Patent: Sep. 1, 2015

(54) ROTATABLE CONNECTOR DEVICE

(71) Applicants: FURUKAWA ELECTRIC CO., LTD., Tokyo (JP); FURUKAWA AUTOMOTIVE SYSTEMS INC., Shiga (JP)

(72) Inventor: Ryoichi Adachi, Shiga (JP)

(73) Assignees: FURUKAWA ELECTRIC CO., LTD., Tokyo (JP); FURUKAWA AUTOMOTIVE SYSTEMS INC., Shiga (JP)

( * ) Notice: Subject to any disclaimer, the term of this patent is extended or adjusted under 35 U.S.C. 154(b) by 39 days.

(21) Appl. No.: 14/021,584

(22) Filed: Sep. 9, 2013

(65) Prior Publication Data

US 2014/0011374 A1    Jan. 9, 2014

Related U.S. Application Data

(63) Continuation of application No. PCT/JP2012/055902, filed on Mar. 8, 2012.

(30) Foreign Application Priority Data

Mar. 9, 2011    (JP) .................................. 2011-050944

(51) Int. Cl.
  *H01R 35/04*  (2006.01)
  *H01R 13/52*  (2006.01)
  *H01R 35/02*  (2006.01)
  *B60R 16/027* (2006.01)

(52) U.S. Cl.
  CPC .............. *H01R 13/52* (2013.01); *B60R 16/027* (2013.01); *H01R 35/025* (2013.01)

(58) Field of Classification Search
  CPC .. H01R 35/025; H01R 35/04; H01R 2201/26; H01R 12/88
  USPC .......................................................... 439/164
  See application file for complete search history.

(56) References Cited

U.S. PATENT DOCUMENTS

| 5,310,356 | A | * | 5/1994 | Obata et al. ................... | 439/169 |
| 7,393,222 | B2 | * | 7/2008 | Asakura ........................ | 439/164 |
| 7,811,108 | B2 | * | 10/2010 | Oishi et al. .................... | 439/164 |
| 2002/0019169 | A1 | * | 2/2002 | Nishimoto et al. ........... | 439/625 |
| 2004/0067670 | A1 | * | 4/2004 | Rhein et al. ................... | 439/164 |
| 2014/0235082 | A1 | * | 8/2014 | Adachi ......................... | 439/164 |
| 2015/0031219 | A1 | * | 1/2015 | Abe et al. ...................... | 439/13 |

FOREIGN PATENT DOCUMENTS

| JP | 2003-197339 A | 7/2003 |
| JP | 2004-222369 A | 8/2004 |
| JP | 2005-158635 A | 6/2005 |
| WO | 99/29004 A1 | 6/1999 |

OTHER PUBLICATIONS

International Search Report issued in International Application No. PCT/JP2012/055902, mailed on Jun. 12, 2012 (2 pages).

* cited by examiner

*Primary Examiner* — Truc Nguyen
(74) *Attorney, Agent, or Firm* — Osha Liang LLP (57) ABSTRACT

In an accommodation space formed by a rotator and a stator, a flat cable and a dummy cable are accommodated. A retainer placed in a bottom part of the accommodation space is provided with a press guide for allowing a reversed part of the dummy cable, at which a winding direction thereof is reversed, to be pressed thereon.

2 Claims, 7 Drawing Sheets

PRIOR ART

ROTATABLE CONNECTOR DEVICE

TECHNICAL FIELD

The present invention relates to a rotatable connector device for, for example, electrically connecting elements on the side of a steering wheel of an automobile and the side of a vehicle body to each other.

BACKGROUND ART

A rotatable connector device which is mountable on a vehicle such as an automobile or the like includes a stator which is to be fixed mainly on the side of a vehicle body and a rotator which is to be assembled to the side of a steering wheel. The stator and the rotator are assembled together coaxially so as to be rotatable with respect to each other. In addition, a flat cable is accommodated in an accommodation space formed by the stator and the rotator.

The flat cable electrically connects an electric device such as a horn module, an airbag module, an audio control module or the like equipped on the side of the steering wheel and a power supply on the side of the vehicle body to each other.

Such a rotatable connector device which is proposed in, for example, Patent Document 1 includes a retainer provided on a bottom surface of an accommodation space and guides the flat cable to be wound around a rotation axis of the steering wheel.

Figure 7:
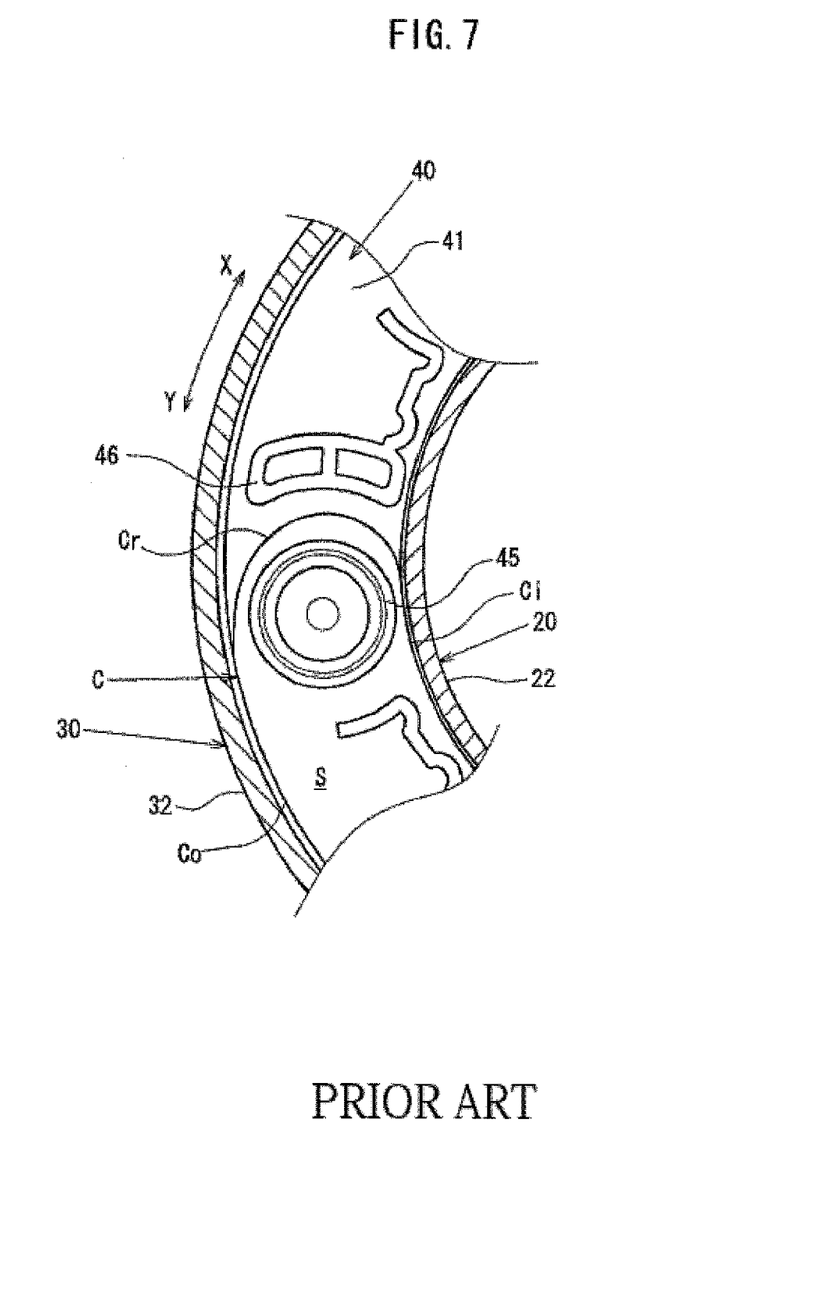
FIG. 7 is a plan view of a press guide according to the conventional art.

The retainer described in Patent Document 1 will be described in detail. As shown in FIG. 7, a retainer 40 is provided with a plurality of rotatable rollers 45 and a press guide 46 provided to stand in the vicinity of the rotatable roller 45. It is described that the retainer 40 rotates to assist a flat cable C to be wound and rewound in an accommodation space S and thus the rotatable connector device can follow a steering operation to smoothly rotate.

In more detail, in the accommodation space S, the flat cable S includes an outside wound part Co wound along an inner circumferential surface of an outer casing 32 of a stator 30, a reversed part Cr wound along one of the rotatable rollers 45 rotatably supported by the retainer 40 to turn around in a U shape, and an inside wound part Ci wound along an outer circumferential surface of an inner circumferential cylindrical section 22 of a rotator 20.

It is described that the rotatable connector device having such a structure operates as follows. When the rotator 20 rotates clockwise (in the direction of X in FIG. 7), the reversed part Cr of the flat cable C is pressed onto the press guide 46, and the retainer 40 can rotate clockwise by the pressing force.

By contrast, when the rotator rotates counterclockwise (in the direction Y in FIG. 7), the reversed part Cr of the flat cable C is pulled counterclockwise along the rotatable roller 45, and thus the retainer 40 can rotate counterclockwise.

When the accommodation space S is contaminated with a foreign object such as sand or the like, there is an undesirable possibility that when the rotator 20 rotates, the reversed part Cr of the flat cable C is abraded to cause malfunctioning.

For example, in the case where a contact part of the reversed part Cr of the flat cable C and the press guide 46 is contaminated with a foreign object such as sand or the like when the rotator 20 rotates clockwise, there is an undesirable possibility that the reversed part Cr is rubbed with the foreign object and thus the flat cable C is abraded to cause malfunctioning.

CITATION LIST

Patent Literature

Patent Document 1: Japanese Laid-Open Patent Publication No. 2003-197339

SUMMARY OF INVENTION

Technical Problem

In light of the above-described problem, the present invention has an object of providing a rotatable connector device which can maintain electrical connection between the rotator and the stator with certainty even when being contaminated with a foreign object such as sand or the like.

Solution to Problem

The present invention is directed to a rotatable connector device including a rotator including an annular rotatable-side ring plate and an inner circumferential cylindrical section having a cylindrical shape and formed along an inner circumferential edge of the rotatable-side ring plate; and a stator including an annular fixed-side ring plate and an outer circumferential cylindrical section having a cylindrical shape and formed along an outer circumferential edge of the fixed-side ring plate. The stator and the rotator are in engagement with each other coaxially so as to be rotatable with respect to each other in a clockwise direction and a counterclockwise direction; and the rotatable-side ring plate and the inner circumferential cylindrical section of the rotator and the fixed-side ring plate and the outer circumferential cylindrical section of the stator form an accommodation space. The rotatable connector device further includes an annular retainer, for supporting a plurality of rotatable rollers, placed in a bottom part of the accommodation space; at least one flat cable for electrically connecting the side of the rotator and the side of the stator to each other and including a reversed part at which a winding direction of the flat cable is reversed, the flat cable being accommodated on the retainer in the accommodation space such that the flat cable can be wound and rewound; a flexible and elastic dummy cable having one end in a longitudinal direction thereof connected and fixed to the side of the rotator and the other end thereof connected and fixed to the side of the stator and including a reversed part directly wound along one of the rotatable rollers to reverse a winding direction thereof, the dummy cable being accommodated such that the dummy cable can be wound and rewound and being stacked on the flat cable; and a press guide, for allowing the reversed part of the dummy cable to be directly pressed thereon, provided on the retainer.

The dummy cable may have an approximately equivalent width to that of the flat cable. For example, the dummy cable may be a band-like element which does not connect the retainer and the rotator to each other electrically, or may be a flat cable which has a conductor but does not connect the rotator and the stator to each other electrically. The dummy cable may be formed of only an insulating member having an insulating property without including a conductor.

According to the present invention, a rotatable connector device which can maintain electrical connection between the rotator and the stator with certainty even when being contaminated with a foreign object such as sand or the like can be provided.

Specifically, unlike the flat cable, the dummy cable non-electrically connects the side of the rotator and the side of the stator to each other. When the rotator rotates clockwise, the reversed part of the dummy cable is pressed onto the press guide, and the retainer can rotate clockwise by the pressing force.

By contrast, when the rotator rotates counterclockwise, the reversed part of the dummy cable is pulled counterclockwise along the rotatable roller. As a result, the retainer can rotate counterclockwise.

Namely, even if the reversed part of the dummy cable is slid together with a foreign object such as sand or the like as a result of contacting the press guide or the rotatable roller when the rotator rotates, the rotator and the stator can maintain the electrical connection to each other by the flat cable, with certainty.

Owing to the elasticity of the dummy cable, the reversed part of the dummy cable pressed onto the press guide can be prevented from being buckled or folded.

At both ends in a length direction of the reversed part of the dummy cable, a repulsive power is generated by the elasticity of the dummy cable in a diametrical direction of the rotator and the stator. This will be described in more detail. At the end of the reversed part of the dummy cable on the side of the stator, a repulsive power is generated outward in the diametrical direction. By contrast, at the end of the reversed part of the dummy cable on the side of the rotator, a repulsive power is generated inward in the diametrical direction. Owing to this, the dummy cable is wound and rewound while being pressed onto the side of the rotator and the side of the stator in the diametrical direction. Therefore, the dummy cable can be suppressed from, for example, being slack, and can contact the press guide with certainty.

For this reason, the retainer can be rotated by the dummy cable with certainty owing to the elasticity of the dummy cable, and also can follow the rotation of the rotator to rotate more smoothly. Since the retainer is smoothly rotated by the dummy cable, the flat cable can be wound and rewound without receiving excessive load and thus can be prevented from, for example, being broken.

In this manner, the retainer is rotated by the dummy cable which non-electrically connects the rotator and the stator to each other, so that the electrical connection between the rotator and the stator can be maintained with certainty even when the rotatable connector device is contaminated with a foreign object such as sand or the like.

In an embodiment of the present invention, the reversed part of the flat cable may be located at a substantially central position in a circumferential direction between the rotatable rollers. Restriction sections for restricting a movement of the dummy cable or the flat cable in a diametric direction may be provided to stand on the retainer in the vicinity of the rotatable rollers, the restriction sections being provided at an interval which is larger than a moving range by which the reversed part of the flat cable moves in the circumferential direction until the retainer starts rotating after the rotator starts rotating.

According to the present invention, when the rotator is still, the reversed part of the flat cable can be located with a sufficient distance from the restriction sections on the retainer. For this reason, even when the rotator rotates, the reversed part of the flat cable can be prevented from contacting the restriction sections on the retainer.

Namely, even when a foreign object such as sand or the like is attached to the reversed part of the flat cable, the reversed part of the flat cable is not wound or rewound while being slid against the restriction sections on the retainer. Therefore, the flat cable can be prevented from being abraded or damaged.

Even when the rotator rotates, the reversed part of the flat cable does not contact any of the restriction sections on the retainer. Therefore, the retainer can follow the rotation of the rotator to smoothly rotate.

In this manner, the reversed part of the flat cable is located with a sufficient distance from the restriction sections on the retainer, so that the flat cable is not abraded or damaged even when the rotator rotates while the rotatable connector device is contaminated with a foreign object such as sand or the like. Therefore, the electrical connection between the rotator and the stator can be maintained with more certainty.

In an embodiment of the present invention, the dummy cable may have a length in the longitudinal direction which is shorter than that of the flat cable in the longitudinal direction.

According to the present invention, the dummy cable can be wound along the rotator while being stacked on the flat cable. Owing to this, the flat cable can be suppressed from, for example, being slack at the time of being wound or rewound, owing to the repulsive power of the reversed part of the dummy cable. Thus, the flat cable can be prevented from being abraded or damaged as a result of contacting the retainer or the like.

In this manner, the length of the dummy cable in the longitudinal direction is shorter than that of the flat cable in the longitudinal direction, so that the flat cable can be prevented from being contacting the restriction sections on the retainer or the like with more certainty. Therefore, the electrical connection between the rotator and the stator can be maintained with more certainty even when the rotatable connector device is contaminated with a foreign object such as sand or the like.

Advantageous Effects of Invention

According to the present invention, a rotatable connector device which can maintain electrical connection between the rotator and the stator with certainty even when being contaminated with a foreign object such as sand or the like can be provided.

DESCRIPTION OF EMBODIMENTS

An embodiment of the present invention will be described with reference to the drawings.

EXAMPLE 1

Figure 1:
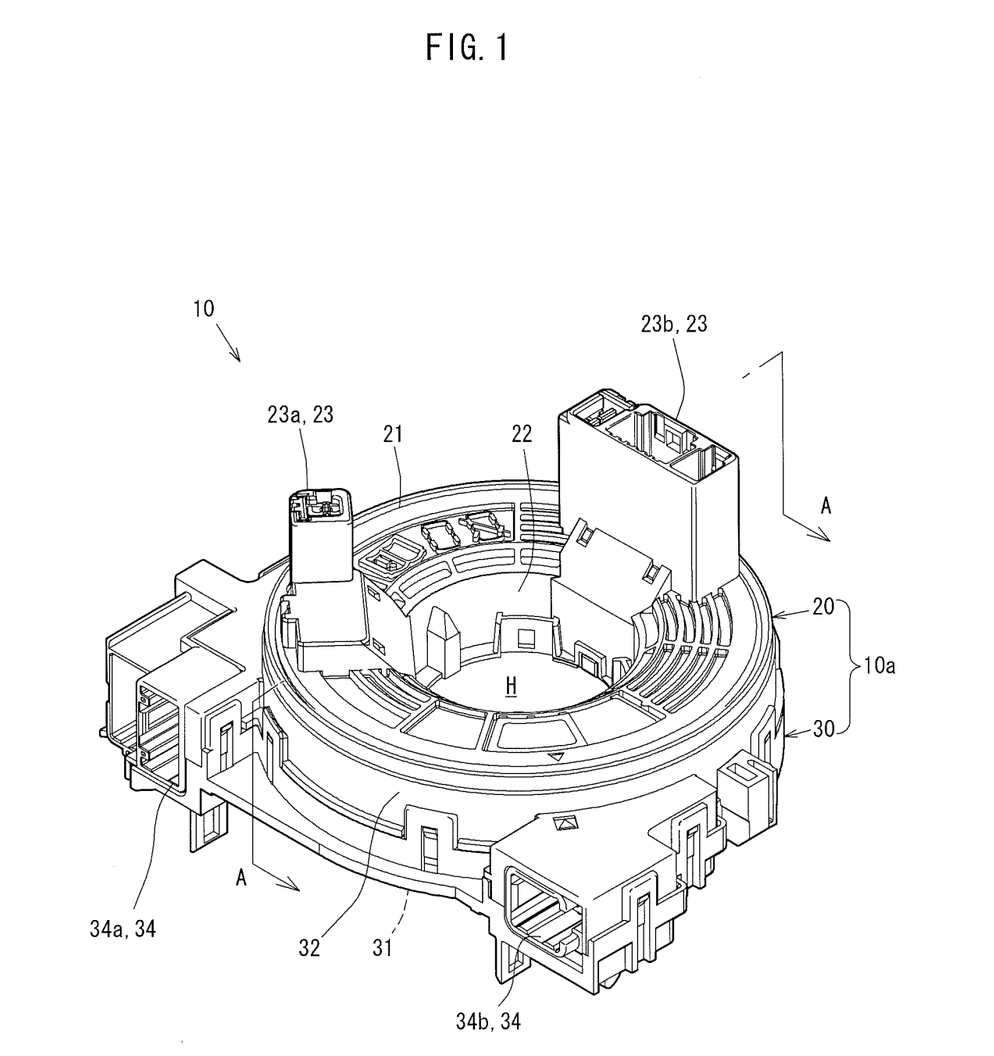
FIG. 1 is an external isometric view of a steering roll connector.
Figure 2:
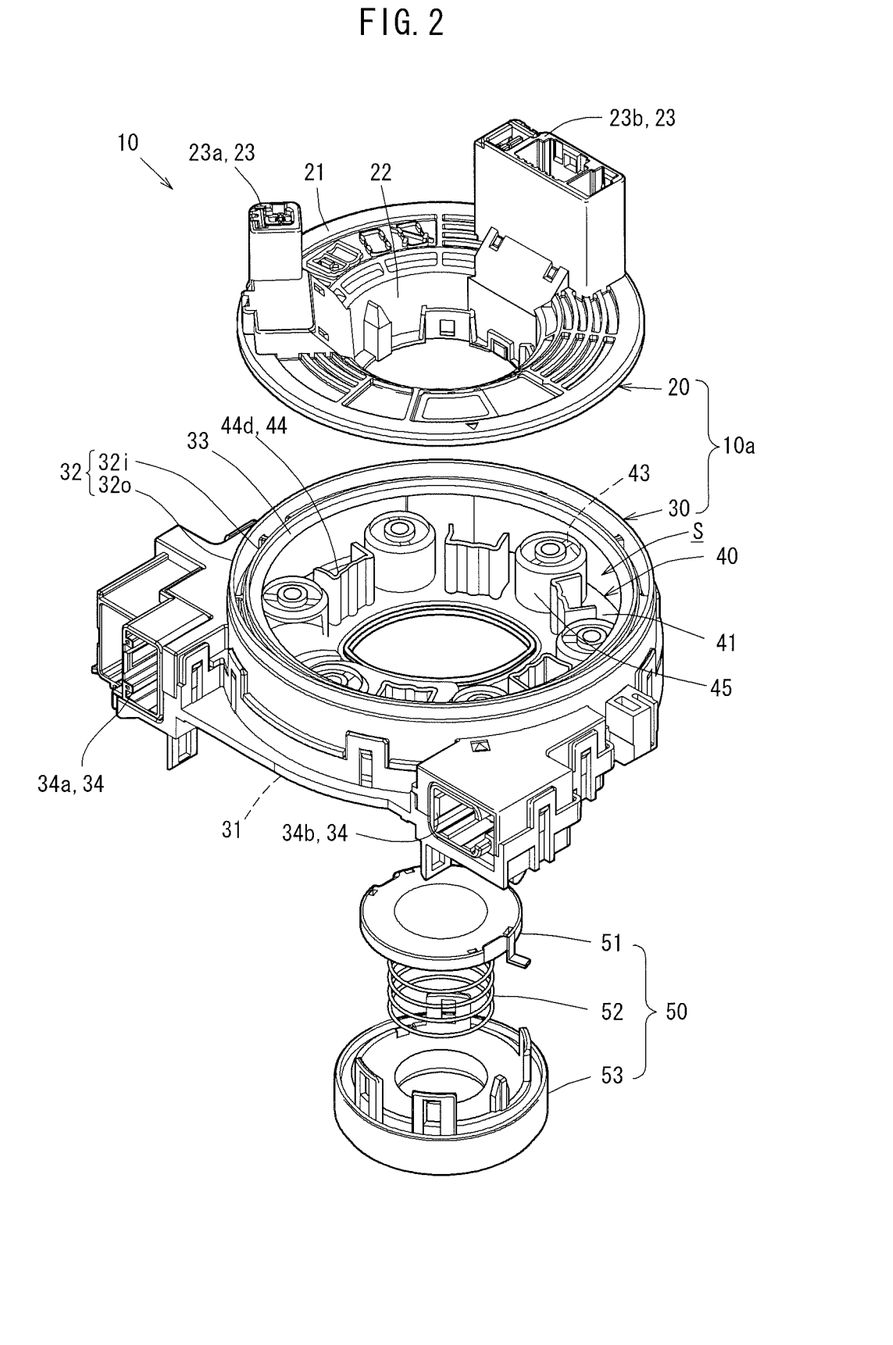
FIG. 2 is an exploded isometric view of the steering roll connector.
Figure 3:
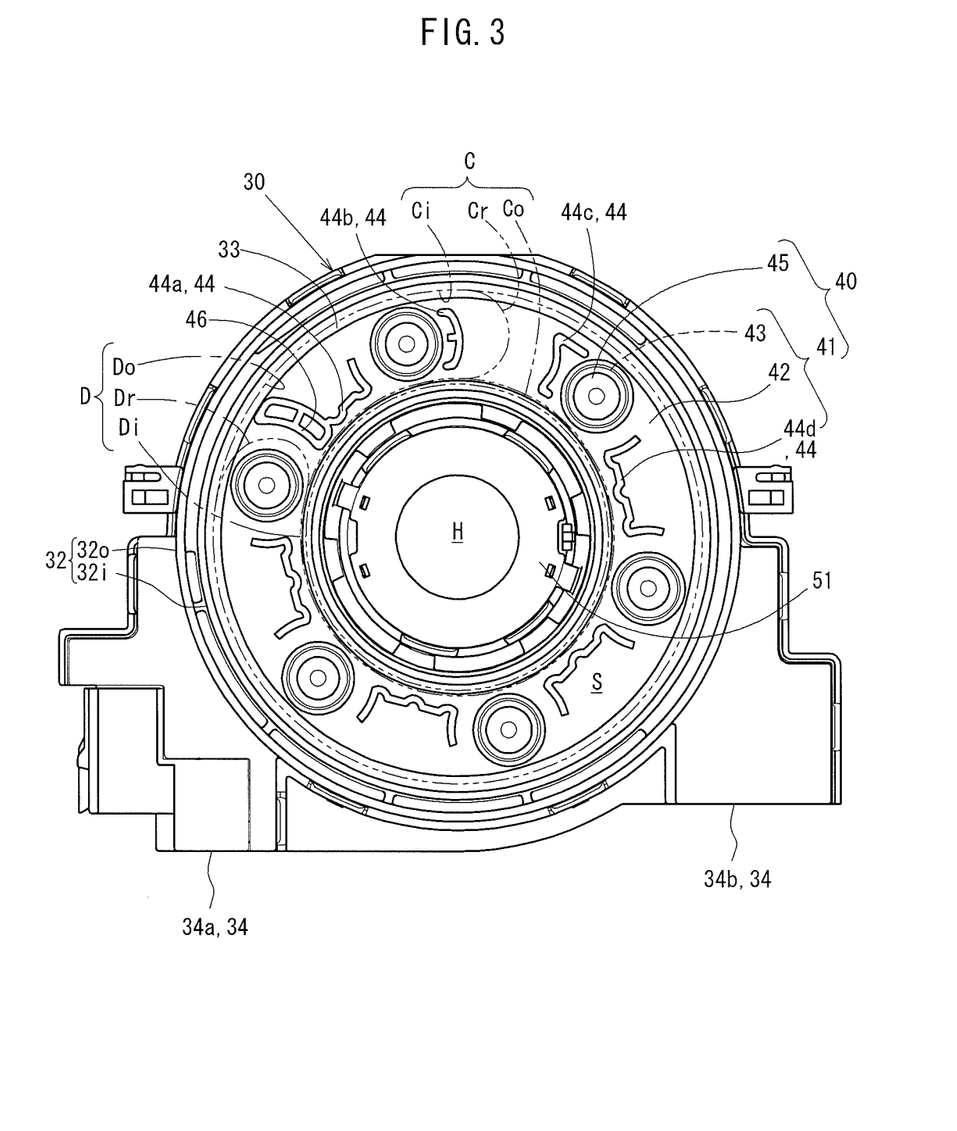
FIG. 3 is a plan view showing the steering roll connector in the state where a rotator is detached.
Figure 4:
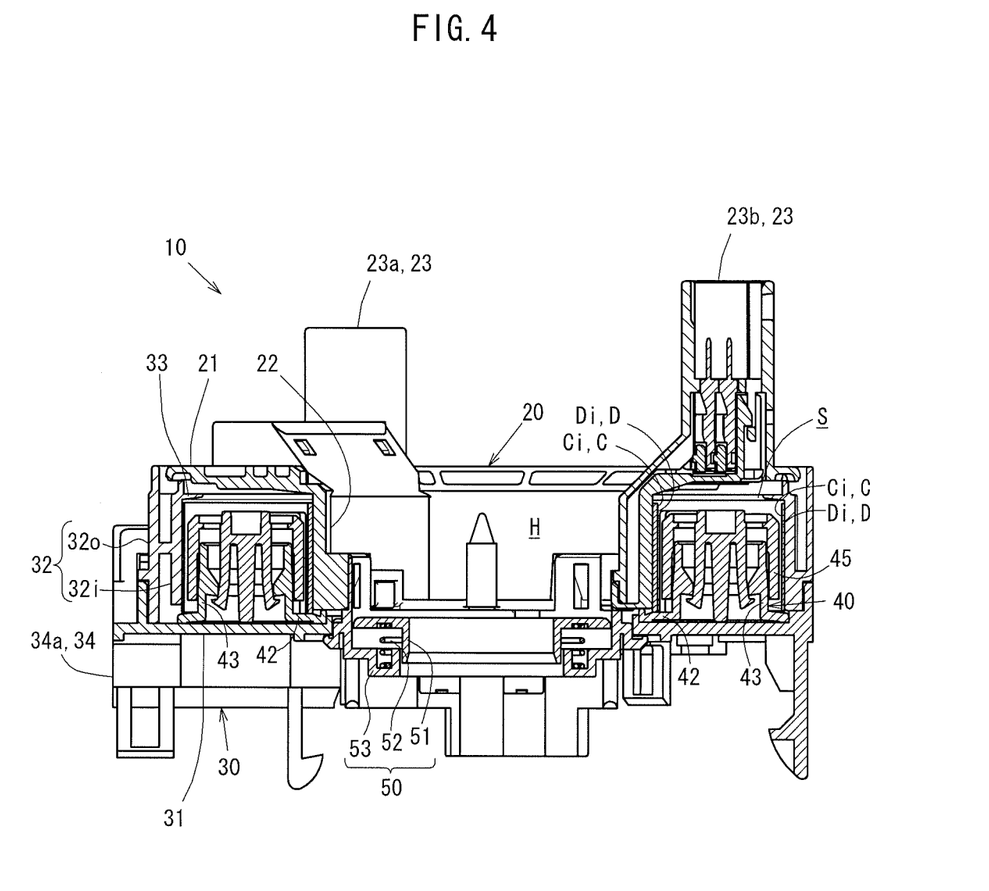
FIG. 4 is a cross-sectional view taken along line A-A in FIG. 1.

FIG. 1 is an external isometric view of a steering roll connector 10. FIG. 2 is an exploded isometric view of the steering roll connector 10. FIG. 3 is a plan view showing the steering roll connector 10 in this embodiment in the state where a rotator 20 is detached. FIG. 4 is a cross-sectional view taken along line A-A in FIG. 1.

As shown in FIG. 1 through FIG. 4, the steering roll connector 10 in this embodiment includes a cable housing 10a, a retainer 40, and a rotation lock body 50.

As shown in FIG. 3 and FIG. 4, the cable housing 10a has a generally cylindrical shape having an insertion hole H at a central portion thereof as seen in a plan view. The insertion hole H runs through the cable housing 10a in a steering rotation axial direction (up-down direction in FIG. 4). The insertion hole H has a diameter which allows a steering shaft (not shown) protruding from a steering column (not shown) to be inserted into the insertion hole H. The cable housing 10a includes the stator 30 and the rotator 20 which are rotatable with respect to each other.

A steering wheel (not shown) for performing a rotation operation is fixed to a top end of the steering shaft.

As shown in FIG. 2, the rotation lock body 50 includes a lock body 51, a spring bearing sleeve 53, and a return spring 52 provided between the lock body 51 and the spring bearing sleeve 53.

The spring bearing sleeve 53 is pushed up against an urging force of the return spring 52, so that the rotator 20 can be locked by the lock body 51 so as not to rotate with respect to the stator 30. A boss (not shown) of a cored bar of the steering wheel is inserted, so that the rotator 20 can be released from the locked state by the lock body 51 to be permitted to freely rotate with respect to the stator 30.

As shown in FIG. 2, the rotator 20 includes a rotatable-side ring plate 21 having an annular shape and acting as a top board, and an inner circumferential cylindrical section 22 having a cylindrical shape and extending downward from an inner circumferential edge of the rotatable-side ring plate 21.

The rotator 20 is fixed to the steering wheel and is rotatable integrally with the steering wheel. In more detail, the rotator 20 is coaxially rotatable with a rotation axis of the steering wheel.

The rotator 20 is provided with rotator-side connectors 23 integrally rotatable with the rotator 20.

The rotator-side connectors 23 include a first rotator-side connector 23a and a second rotator-side connector 23b. The first rotator-side connector 23a and the second rotator-side connector 23b are located with a predetermined distance being kept therebetween in a circumferential direction of the rotatable-side ring plate 21, and each have a connector-connecting opening directed upward.

The rotator-side connectors 23 (23a, 23b) are each connected to, for example, a cable (not shown) drawn from an electrical circuit of a horn switch, an airbag unit or the like located on the steering wheel.

The stator 30 is fixed to an appropriate component on the side of the vehicle body, for example, a combination bracket switch (not shown) located inside the steering column, and is rotatable with respect to the steering wheel. As shown in FIG. 2, the stator 30 includes a fixed-side ring plate 31 having an annular shape and acting as a bottom board and an outer circumferential cylindrical section 32 having a cylindrical shape and extending upward from an outer circumferential edge of the fixed-side ring plate 31. The outer circumferential edge of the fixed-side ring plate 31 and a bottom end of the outer circumferential cylindrical section 32 are engaged with each other to be integral.

As shown in FIG. 3 and FIG. 4, the outer circumferential cylindrical section 32 includes an outer-side outer circumferential cylindrical section 32o having a cylindrical shape and an inner-side outer circumferential cylindrical section 32i having a cylindrical shape and having a diameter slightly smaller than that of the outer-side outer circumferential cylindrical section 32o. The outer-side outer circumferential cylindrical section 32o and the inner-side outer circumferential cylindrical section 32i are located concentrically, and face and are close to each other in a radial direction. Thus, the outer circumferential cylindrical section 32 has a two-layer structure in a diametrical direction.

As shown in FIG. 4, on the inner-side outer circumferential cylindrical section 32i, a brim-shaped guide projection piece 33 is provided. The guide projection piece 33 projects inward (internally) in the radial direction to guide a flat cable C and a dummy cable D described later from above.

The stator 30 is provided with stator-side connectors 34.

The stator-side connectors 34 include a first stator-side connector 34a and a second stator-side connector 34a. The first stator-side connector 34a and the second stator-side connector 34a are located outer to the outer circumferential cylindrical section 32 (outer-side outer circumferential cylindrical section 32o) while having a predetermined distance therebetween, and each have a connector-connecting opening directed in the same direction.

The stator-side connectors 34 (34a, 34a) are each connected to a cable (not shown) drawn from an electrical circuit or the like on the side of the vehicle body in a lower column cover (not shown).

As shown in FIG. 2 through FIG. 4, inside the cable housing 10a including the stator 30 and the rotator 20 each having such a structure and assembled coaxially with the rotation axis of the steering wheel, the fixed-side ring plate 31 of the stator 30 faces the rotatable-side ring plate 21 of the rotator 20 in the rotation axial direction, and the outer circumferential cylindrical section 32 of the stator 30 faces, and is located outer in the radial direction to, the inner circumferential cylindrical section 22 of the rotator 20. Thus, an accommodation space S is formed.

The accommodation space S accommodates the retainer 40, the flat cable C and the dummy cable D.

As shown in FIG. 2 through FIG. 4, the retainer 40 includes a plurality of rotatable rollers 45 and a base ring 41, and is placed on a bottom surface of the stator 30, which is an element to form the accommodating space S, such that the retainer 40 is rotatable around a rotation axis of the rotator 20.

The base ring 41 includes a plate-like base ring main body 42 having an annular shape as seen in a plan view, roller supporting projections 43, diametrical direction restriction sections 44, and a press guide 46.

The base ring main body 42 is slidable in the rotation direction with respect to the fixed-side ring plate 31, and is rotatable with respect to the stator 30.

The roller supporting projections 43 are located at an equal interval in a circumferential direction of the base ring main body 42 and project upward so as to support the rotatable rollers 45.

The diametrical direction restriction sections 44 are located between the roller supporting projections 43 adjacent to each other in the circumferential direction. The diametrical direction restriction sections 44 include a first diametrical direction restriction section 44a, a second diametrical direction restriction section 44a, a third diametrical direction restriction section 44c, and a fourth diametrical direction restriction section 44d, which have different shapes from each other in accordance with the path of the flat cable C and the dummy cable D. The diametrical direction restriction sections 44 are provided to stand upward from the base ring main body 42.

The first diametrical direction restriction section 44a is provided to stand close to a convex side of a part of the dummy cable D which is wound in a U shape along one of the rotatable rollers 45, supported by the plurality of roller supporting projections 43, to turn around (convex side of a reversed part Dr of the dummy cable D described later.

The first diametrical direction restriction section 44a has a concave shape, as seen in a plan view, having an opening on the diametrically outer side, so as to guide, from the diametrically outer side, the flat cable C (inside wound part Ci of the flat cable described later) and the dummy cable D (inside wound part Di of the dummy cable described later) which are wound along an outer circumferential surface of the inner circumferential cylindrical section 22 of the rotator 20 as seen in a plan view.

On an end surface of the first diametrical direction restriction section 44a facing the reversed part Dr of the dummy cable D, the press guide 46 is formed integrally therewith.

The press guide 46 is formed to be curved in a generally bow shape as seen in a plan view so as to be along the reversed part Dr of the dummy cable D.

The second diametrical direction restriction section 44a is provided to stand close to the roller supporting projection 43 which is adjacent in the circumferential direction to the roller supporting projection 43 along which the reversed part Dr of the dummy cable D is wound, with the first diametrical direction restriction section 44a being interposed between these two roller supporting projections 43. The second diametrical direction restriction section 44a faces the first diametrical direction restriction section 44a in the circumferential direction, with the roller supporting projection 43 close to the second diametrical direction restriction section 44a being interposed between the second diametrical direction restriction section 44a and the first diametrical direction restriction section 44a.

The second diametrical direction restriction section 44a has a generally concave shape, as seen in a plan view, having an opening on the side of the roller supporting projection 43 close thereto as seen in a plan view. The second diametrical direction restriction section 44a guides, from the diametrically outer side, the inside wound part Ci of the flat cable C and the inside wound part Di of the dummy cable D.

The third diametrical direction restriction section 44c is provided to stand between the second diametrical direction restriction section 44a and the roller supporting projection 43 which is adjacent to the roller supporting projection 43 close to the second diametrical direction restriction section 44a. More specifically, the above adjacent roller supporting projection 43 is adjacent in the circumferential direction directed from the roller supporting projection 43 close to the second diametrical direction restriction section 44a toward the second diametrical direction restriction section 44a. The third diametrical direction restriction section 44c is close to the above adjacent roller supporting projection 43.

The third diametrical direction restriction section 44c has a generally concave shape, as seen in a plan view, having an opening on the side of the roller supporting projection 43 close thereto as seen in a plan view. The third diametrical direction restriction section 44c guides, from the diametrically outer side, the inside wound part Ci of the flat cable C and the inside wound part Di of the dummy cable D.

The fourth diametrical direction restriction section 44d is provided to stand in areas, between the roller supporting projections 43 adjacent to each other in a circumferential direction of the retainer 40, where none of the first diametrical direction restriction section 44a, the second diametrical direction restriction section 44a and the third diametrical direction restriction section 44c is provided to stand.

The fourth diametrical direction restriction section 44d has a generally concave shape, as seen in a plan view, having an opening on the diametrically outer side so as to guide, from the diametrically outer side, the inside wound part Ci of the flat cable C and the inside wound part Di of the dummy cable D which are wound along the outer circumferential surface of the inner circumferential cylindrical section 22 of the rotator 20 as seen in a plan view.

The rotatable rollers 45 are supported by the roller supporting projections 43 and are each rotatable around an axis thereof parallel to the rotation axis of the rotator 20.

The flat cable C is a flexible band-like transmission line including a plurality of flat conductors which are located parallel to each other at a predetermined pitch and are covered with an insulating cover. The flat cable C is accommodated in the accommodation space S in a wound state, and electrically connects the first rotator-side connector 23a and the first stator-side connector 34a to each other.

In more detail, one end in a length direction of the flat cable C is connected to the first rotator-side connector 23a, and the other end thereof is connected to the first stator-side connector 34a.

The flat cable C is supported by the retainer 40, which is located on the fixed-side ring plate 31 so as to be rotatable with respect thereto, in the accommodation space S inside the cable housing 10a. In the accommodation space S, the flat cable C is wound.

This will be described in more detail. The flat cable C is drawn from the first stator-side connector 34a into the accommodation space S. As shown in FIG. 3 and FIG. 4, the flat cable C includes an outside wound part Co wound along an inner circumferential surface of the outer circumferential cylindrical section 32 (inner-side outer circumferential cylindrical section 32i) of the stator 30, outside the retainer 40.

As represented by the two-dot chain line in FIG. 3, the flat cable C includes the reversed part Cr in the middle of the length direction thereof. The reversed part Cr is wound in a U shape along one of the rotatable rollers 45, close to the second diametrical direction restriction section 44a, to turnaround. The reversed part Cr is located at a substantially central position in the circumferential direction between the second diametrical direction restriction section 44a and the third diametrical direction restriction section 44c so as to have a sufficient distance from each of the second diametrical direction restriction section 44a and the third diametrical direction restriction section 44c.

The flat cable C also includes the inside wound part Ci, which is a part closer than the revered part Cr to a tip thereof in the length direction, and is wound along the outer circumferential surface of the inner circumferential cylindrical section 22 of the rotator 20, inside the retainer 40. The flat cable C is finally drawn out of the accommodation space S and is connected to the first rotator-side connector 23a.

The dummy cable D is an elastic and flexible band-like cable covered with an insulating cover, and is shorter than the flat cable C in the length direction thereof. The dummy cable D is accommodated in the accommodation space S while being stacked on the flat cable C and wound, and non-electrically connects the rotator 20 and the stator 30 to each other.

In more detail, one end in the length direction of the dummy cable D is connected and thus fixed to a position in the vicinity of the first rotator-side connector 23a, and the other end thereof is connected and thus fixed to a position in the vicinity of the first stator-side connector 34a.

The dummy cable D is drawn from the first stator-side connector 34a into the accommodation space S while being stacked on the flat cable C. As shown in FIG. 3 and FIG. 4, the dummy cable D includes the outside wound part Do wound along the inner circumferential surface of the outer circumferential cylindrical section 32 (inner-side outer circumferential cylindrical section 32i) of the stator 30, outside the retainer 40.

As represented by the two-dot chain line in FIG. 3, the dummy cable D includes the reversed part Dr in the middle of the length direction thereof. The reversed part Dr is wound in a U shape along the rotatable roller 45, close to the press guide 46, to turn around.

The dummy cable D also includes the inside wound part Di, which is a part closer than the revered part Dr to a tip thereof in the length direction, and is wound along the outer circumferential surface of the inner circumferential cylindrical section 22 of the rotator 20 while being stacked on the flat cable C, inside the retainer 40. The dummy cable D is finally drawn out of the accommodation space S and is connected and thus fixed to a position in the vicinity of the first rotator-side connector 23a.

The flat cable C and the dummy cable D are wound around in the accommodation space S while being stacked on each other. However, in FIG. 3 and FIG. 4, one cable is shown for the sake of simplicity.

Now, an operation of the flat cable C and the dummy cable D in the accommodation space S of the steering roll connector 10 having the above-described structure when the rotator 20 rotates clockwise and counterclockwise will be described with reference to FIG. 5.

Figure 5A:
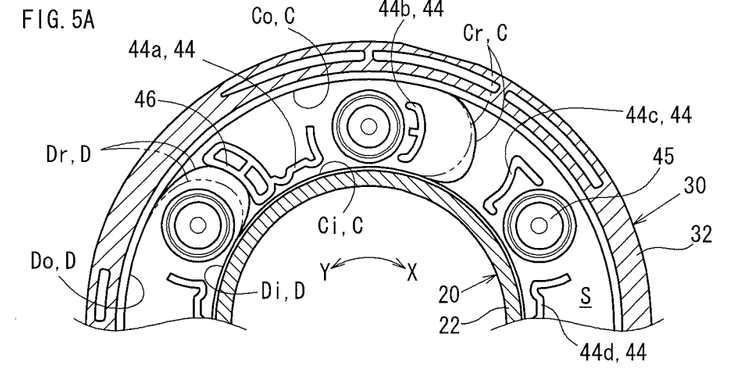
FIGS. 5A and 5B are plan views showing a state of an accommodation space while the rotator is rotated.
Figure 5B:
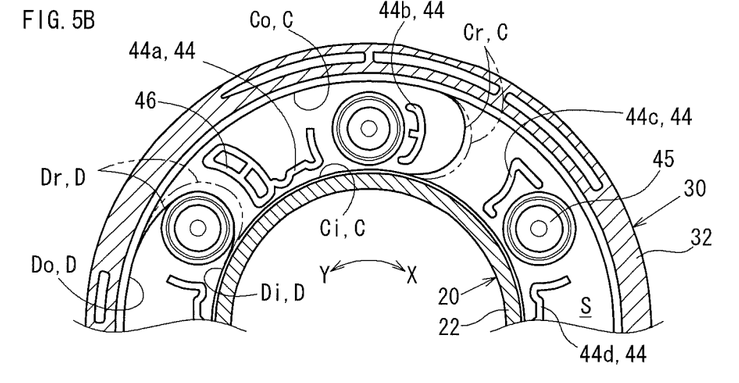

FIG. 5 provides plan views showing a state in the accommodation space S when the rotator 20 is rotated. FIG. 5A shows a state where the rotator 20 is rotated clockwise (direction of arrow X in FIG. 5), and FIG. 5B shows a state where the rotator 20 is rotated counterclockwise (direction of arrow Y in FIG. 5).

In FIG. 5, the reversed part Cr of the flat cable C and the reversed part Dr of the dummy cable D when the rotator 20 is still are represented with the two-dot chain line. The flat cable C and the dummy cable D are wound in a stacked state in the accommodation state S as described above, but FIG. 5 shows one cable for the sake of simplicity.

When the rotator 20 rotates clockwise (direction of arrow X in FIG. 5), the following occurs. When the rotator 20 rotates with respect to the stator 30, as shown in FIG. 5A, the outside wound part Co of the flat cable C and the outside wound part Do of the dummy cable D are wound or rewound, and the inside wound part Ci of the flat cable C and the inside wound part Di of the dummy cable D are rewound or wound, in the accommodation space S.

In this state, the reversed part Cr of the flat cable C rotates together with the retainer 40 when necessary, as following a change in the balance of the wound state between the outside wound part Co and the inside wound part Ci.

Similarly, the reversed part Dr of the dummy cable D rotates together with the retainer 40 when necessary, as following a change in the balance of the wound state between the outside wound part Do and the inside wound part Di.

This will be described in detail. When the rotator 20 rotates clockwise (direction of arrow X in FIG. 5), as shown in FIG. 5A, the inside wound part Ci of the flat cable C and the inside wound part Di of the dummy cable D are rewound.

In this state, the distance between the second diametrical direction restriction section 44a and the third diametrical direction restriction section 44c is longer than the distance between the rotatable roller 45 along which the reversed part Dr of the dummy cable D is wound and the press guide 46, in the circumferential direction of the retainer 40.

The reversed part Cr of the flat cable C is located at a substantially central position in the circumferential direction between the second diametrical direction restriction section 44a and the third diametrical direction restriction section 44c. Therefore, as shown in FIG. 5A, the reversed part Dr of the dummy cable D is pressed onto the press guide 46 before the reversed part Cr of the flat cable C contacts the third diametrical direction restriction section 44c.

When the reversed part Dr of the dummy cable D is pressed onto the press guide 46, the retainer 40 rotates clockwise (direction of arrow X in FIG. 5) as following the rotation of the rotator 20 by the pressing force.

The reversed part Cr of the flat cable C and the reversed part Dr of the dummy cable D are respectively wound along the outside wound part Co of the flat cable C and the outside wound part Do of the dummy cable D while rotating together with the retainer 40.

In this state, the reversed part Cr of the flat cable C rotates together with the retainer 40 while keeping a constant distance from the second diametrical direction restriction section 44a and the third diametrical direction restriction section 44c.

By contrast, when the rotator 20 rotates counterclockwise (direction of arrow Y in FIG. 5), the following occurs. When the rotator 20 rotates with respect to the stator 30, as shown in FIG. 5B, the outside wound part Co of the flat cable C and the outside wound part Do of the dummy cable D are rewound or wound, and the inside wound part Ci of the flat cable C and the inside wound part Di of the dummy cable D are wound or rewound, in the accommodation space S.

In this state, the reversed part Cr of the flat cable C rotates together with the retainer 40 when necessary, as following a change in the balance of the wound state between the outside wound part Co and the inside wound part Ci.

Similarly, the reversed part Dr of the dummy cable D rotates together with the retainer 40 when necessary, as following a change in the balance of the wound state between the outside wound part Do and the inside wound part Di.

This will be described in detail. When the rotator 20 rotates counterclockwise (direction of arrow Y in FIG. 5), as shown in FIG. 5B, the reversed wound part Cr of the flat cable C and the reversed wound part Dr of the dummy cable D are wound along the outer circumferential surface of the inner circumferential cylindrical section 22 of the rotator 20.

In this state, the distance between the second diametrical direction restriction section 44a and the third diametrical direction restriction section 44c is longer than the distance between the rotatable roller 45 along which the reversed part Dr of the dummy cable D is wound and the press guide 46, in the circumferential direction of the retainer 40.

The reversed part Cr of the flat cable C is located at a substantially central position in the circumferential direction between the second diametrical direction restriction section 44a and the third diametrical direction restriction section 44c. Therefore, as shown in FIG. 5B, the reversed part Dr of the dummy cable D contacts the rotatable roller 45 before the reversed part Cr of the flat cable C contacts the second diametrical direction restriction section 44a.

Then, the reversed part Dr of the dummy cable D is pulled counterclockwise (direction of arrow Y in FIG. 5) along the rotatable roller 45. As a result, the retainer 40 rotates counterclockwise as following the rotation of the rotator 20.

Then, the reversed part Cr of the flat cable C and the reversed part Dr of the dummy cable D are respectively wound along the inside wound part Ci of the flat cable C and the inside wound part Di of the dummy cable D while rotating together with the retainer 40.

In this state, the reversed part Cr of the flat cable C rotates together with the retainer 40 while keeping a constant distance from the second diametrical direction restriction section 44a and the third diametrical direction restriction section 44c.

The steering roll connector 10 having the above-described structure and capable of operating as described above can maintain the electrical connection between the rotator 20 and the stator 30 with certainty even when being contaminated with a foreign object such as sand or the like.

Specifically, the above-described operation is provided owing to the dummy cable D which non-electrically connects the side of the rotator 20 and the side of the stator 30 to each other, unlike the flat cable C. When the rotator 20 rotates clockwise, the reversed part Dr of the dummy cable 20 is pressed onto the press guide 46, and the retainer 40 can rotate clockwise owing to the pressing force.

By contrast, when the rotator 20 rotates counterclockwise, the reversed part Dr of the dummy cable D is pulled counterclockwise along the rotatable roller 45, and thus the retainer 40 can rotate counterclockwise.

Therefore, even if the reversed part Dr of the dummy cable D is slid together with a foreign object such as sand or the like in contact with the press guide 46 or the rotatable roller 45 when the rotator 20 rotates, the rotator 20 and the stator 30 can maintain the electrical connection to each other by the flat cable C, with certainty.

Owing to the elasticity of the dummy cable D, the reversed part Dr of the dummy cable D pressed onto the press guide 46 can be prevented from being buckled or folded.

At both ends in the length direction of the reversed part Dr of the dummy cable D, a repulsive power is generated by the elasticity of the dummy cable D in the diametrical direction of the rotator 20 and the stator 30. This will be described in more detail. At the end of the reversed part Dr of the dummy cable ID on the side of the stator 30, a repulsive power is generated outward in the diametrical direction. By contrast, at the end of the reversed part Dr of the dummy cable D on the side of the rotator 20, a repulsive power is generated inward in the diametrical direction. Owing to this, the dummy cable D is wound and rewound while being pressed onto the rotator 20 and the stator 30. Therefore, the dummy cable D can be suppressed from, for example, being slack, and can contact the press guide 46 with certainty.

For this reason, the retainer 40 can be rotated by the dummy cable ID with certainty owing to the elasticity of the dummy cable D, and also can follow the rotation of the rotator 20 to rotate more smoothly. Since the retainer 40 is smoothly rotated by the dummy cable D, the flat cable C can be wound and rewound without receiving excessive load and thus can be prevented from, for example, being broken.

In addition, the dummy cable D is stacked on the flat cable D. Therefore, the flat cable C can be suppressed from, for example, being slack at the time of being wound or rewound, owing to the repulsive power of the reversed part Dr of the dummy cable D. Thus, the flat cable C can be prevented from being abraded or damaged as a result of contacting the retainer 40 or the like.

In this manner, the retainer 40 is rotated by the dummy cable D which non-electrically connects the rotator 20 and the stator 30 to each other, so that the electrical connection between the rotator 20 and the stator 30 can be maintained with certainty even when the steering roll connector 10 is contaminated with a foreign object such as sand or the like.

The diametrical direction restriction sections 44 are provided to stand with a distance equal to or longer than the range in which the reversed part Cr of the flat cable C moves in the circumferential direction until the retainer 40 starts rotating after the rotator 20 starts rotating. Therefore, when the rotator 20 is still, the reversed part Cr of the flat cable C can be located with a sufficient distance from the second diametrical direction restriction section 44a and the third diametrical direction restriction section 44c on the retainer 40. For this reason, even when the rotator 20 rotates, the reversed part Cr of the flat cable C can be prevented from contacting the second diametrical direction restriction section 44a or the third diametrical direction restriction section 44c on the retainer 40.

Namely, even when a foreign object such as sand or the like is attached to the reversed part Cr of the flat cable C, the reversed part Cr of the flat cable C is not wound or rewound while being slid against the second diametrical direction restriction section 44a or the third diametrical direction restriction section 44c on the retainer 40. Therefore, the flat cable C can be prevented from being abraded or damaged.

As a result, the retainer 40 can follow the rotation of the rotator 20 to smoothly rotate, and the flat cable C can be wound and rewound without receiving excessive load.

In this manner, the reversed part Cr of the flat cable C is located with a sufficient distance from the second diametrical direction restriction section 44a and the third diametrical direction restriction section 44c on the retainer 40, so that the flat cable C is not abraded or damaged even when the rotator 20 rotates while the steering roll connector 10 is contaminated with a foreign object such as sand or the like. Therefore, the electrical connection between the rotator 20 and the stator 30 can be maintained with more certainty.

EXAMPLE 2

Now, in another embodiment, a case where there are two flat cables will be described with reference to FIG. 6.

Figure 6:
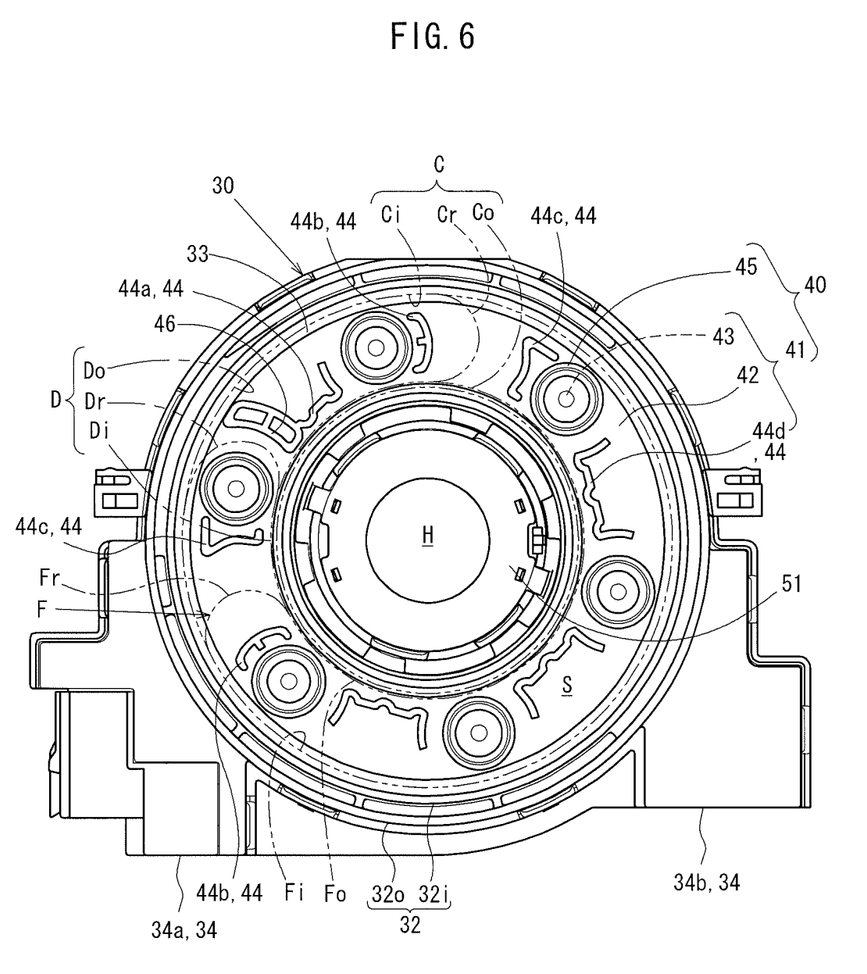
FIG. 6 is a plan view showing a steering roll connector in the state where a rotator is detached in another embodiment.

FIG. 6 is a plan view of the steering roll connector 10 in Example 2 in the state where the rotator 20 is detached.

Elements identical to those of Example 1 described above will bear identical reference signs thereto, and detailed descriptions thereof will be omitted.

As shown in FIG. 6, the steering roll connector 10 in Example 2 includes a flat cable F accommodated in the accommodation space S in addition to the elements in Example 1. Because the flat cable F is added, the structure of the diametrical direction restriction sections 44 on the retainer 40 is different from that in Example 1.

This will be described in detail. The third diametrical direction restriction section 44c is provided to stand on the retainer 40 close to the rotatable roller 45 along which the reversed part Dr of the dummy cable D is wound, and faces the first diametrical direction restriction section 44a in the circumferential direction with the rotatable roller 45 being interposed between the third diametrical direction restriction section 44c and the first diametrical direction restriction section 44a.

The second diametrical direction restriction section 44a is provided to stand between the third diametrical direction restriction section 44c and the rotatable roller 45 adjacent in the circumferential direction to the rotatable roller 45 along which the reversed part Dr of the dummy cable D is wound. The second diametrical direction restriction section 44a is close to the adjacent rotatable roller 45.

The flat cable F is a flexible band-like transmission line including a plurality of flat conductors which are located parallel to each other at a predetermined pitch and are covered with an insulating cover. The flat cable F is shorter in the length direction than the dummy cable D. The flat cable F is accommodated in the accommodation space S while being stacked on the flat cable C and the dummy cable D and wound, and electrically connects the second rotator-side connector 23*b* and the second stator-side connector 34*a* to each other.

In more detail, one end in the length direction of the flat cable F is connected to the second rotator-side connector 23*b*, and the other end thereof is connected to the second stator-side connector 34*a*.

The flat cable F is supported by the retainer 40, which is located on the fixed-side ring plate 31 so as to be rotatable with respect thereto, in the accommodation space S inside the cable housing 10*a*. In the accommodation space S, the flat cable F is accommodated while being stacked on the flat cable C and the dummy cable ID and wound.

This will be described in more detail. The flat cable F is drawn from the second stator-side connector 34*a* into the accommodation space S. As shown in FIG. 6, the flat cable F includes an outside wound part Fo wound as being stacked on the flat cable C and the dummy cable D along the inner circumferential surface of the outer circumferential cylindrical section 32 (inner-side outer circumferential cylindrical section 32*i*) of the stator 30, outside the retainer 40.

In this state, the flat cable C, the dummy cable D and the flat cable F which are stacked in this order are wound such that the flat cable C is in contact with the inner circumferential surface of the inner-side outer circumferential cylindrical section 32*i* of the stator 30.

As represented by the two-dot chain line in FIG. 6, the flat cable F includes a reversed part Fr in the middle of the length direction thereof. The reversed part Fr is wound in a U shape along the rotatable roller 45. This rotatable roller 45 is adjacent in the circumferential direction to the rotatable roller 45 along which the reversed part Dr of the dummy cable D is wound and is located on the opposite side to the first diametrical direction section 44*a*. The reversed part Fr is wound in this manner to turn around. The reversed part Fr is located at a substantially central position in the circumferential direction between the second diametrical direction restriction section 44*a* and the third diametrical direction restriction section 44*c* so as to have a sufficient distance from each of the second diametrical direction restriction section 44*a* and the third diametrical direction restriction section 44*c*.

The flat cable F also includes an inside wound part Fi, which is a part closer than the revered part Fr to a tip thereof in the length direction, and is wound, while being stacked on the flat cable C and the dummy cable D, along the outer circumferential surface of the inner circumferential cylindrical section 22 of the rotator 20, inside the retainer 40. The flat cable F is finally drawn out of the accommodation space S and is connected to the second rotator-side connector 23*b*.

In this state, the flat cable C, the dummy cable D and the flat cable F which are stacked in this order are wound such that the flat cable C is in contact with the outer circumferential surface of the inner circumferential cylindrical section 22 of the rotator 20.

The flat cable C, the dummy cable D and the flat cable F are wound in the accommodation space S while being stacked together as described above, but FIG. 6 shows one cable for the sake of simplicity.

In the steering roll connector 10 including the flat cables C and F and the dummy cable D as described above, the reversed part Fr of the flat cable F is located with a sufficient distance from the third diametrical direction restriction section 44*c* in the circumferential direction, like the reversed part Cr of the flat cable C. Therefore, when the rotator 20 rotates clockwise, the reversed part Dr of the dummy cable D is pressed onto the press guide 46 before the reversed part Fr of the flat cable F contacts the third diametrical direction restriction section 44*c*.

When the reversed part Dr of the dummy cable D is pressed onto the press guide 46, the retainer 40 rotates clockwise as following the rotation of the rotator 20 by the pressing force.

By contrast, when this occurs, the reversed part Fr of the flat cable F rotates together with the retainer 40 while keeping a constant distance from the second diametrical direction restriction section 44*a* and the third diametrical direction restriction section 44*c*.

When the rotator 20 rotates counterclockwise, the reversed part Dr of the dummy cable D contacts the rotatable roller 45 before the reversed part Or of the flat cable C and the reversed part Fr of the flat cable F contact the second diametrical direction restriction section 44*a*.

Then, the reversed part Dr of the dummy cable D is pulled counterclockwise along the rotatable roller 45. As a result, the retainer 40 rotates counterclockwise as following the rotation of the rotator 20.

When this occurs, the reversed part Fr of the flat cable F rotates together with the retainer 40 while keeping a constant distance from the second diametrical direction restriction section 44*a* and the third diametrical direction restriction section 44*c*.

As described above, even in the steering roll connector 10 including a plurality of flat cables, the dummy cable D is pressed onto the press guide 46 before the flat cables C and F contact the second diametrical direction restriction section 44*a* and the third diametrical direction restriction section 44*c*. Therefore, the electrical connection between the rotator 20 and the stator 30 can be maintained with certainty even when the steering roll connector 10 is contaminated with a foreign object such as sand or the like.

At both ends in the length direction of the reversed part Fr of the flat cable F, a repulsive power is generated by the elasticity of the conductor in the diametrical direction of the rotator 20 and the stator 30. Owing to the repulsive power, the flat cable F can be suppressed from, for example, being slack at the time of being wound or rewound.

In addition, the flat cable F is stacked on the dummy cable D. Therefore, the dummy cable D and the flat cable C can be suppressed from, for example, being slack at the time of being wound or rewound owing to the repulsive power of the reversed part Fr of the flat cable F.

Thus, the flat cable C and the flat cable F can be prevented from being abraded or damaged as a result of contacting the diametrical direction restriction section 44 of the retainer 40 or the like.

Since the dummy cable D is stacked between the flat cable C and the flat cable F, the dummy cable D can act as an insulating body between the flat cable C and the flat cable F.

Owing to this, the insulating cover of the flat cable C and the flat cable F can be formed to be thinner, which can reduce the weight and the cost of the steering roll connector 10.

In Example 2 described above, the dummy cable D is stacked between the flat cable C and the flat cable F. However, the manner of stacking the flat cables C and F and the dummy cable ID is not limited to this. The dummy cable D may be stacked on at least one of two outer surfaces of the stacked flat cables C and F.

The reversed part Fr of the flat cable F and the reversed part Cr of the flat cable C are located to have the reversed part Dr of the dummy cable D therebetween on the retainer 40 in the circumferential direction. The positional arrangement of the reversed parts on the retainer 40 in the circumferential direction is not limited to this.

For example, the reversed part Dr of the dummy cable D, the reversed part Cr of the flat cable C, and the reversed part Fr of the flat cable F may be located in this order on the retainer 40 in the circumferential direction thereof.

In Example 1 and Example 2 described above, one end of the dummy cable D in the length direction is connected to a position in the vicinity of the first rotator-side connector 23a, and the other end thereof is connected to a position in the vicinity of the first stator-side connector 34a. The manner of connection is not limited to this.

For example, an end of the dummy cable D in the length direction may be connected and fixed to the inner circumferential cylindrical section 22 of the rotator 20 or the outer circumferential cylindrical section 32 of the stator 30. Alternatively, an end of the dummy cable D in the length direction may be connected to, for example, a connector terminal at an end of the flat cable C or F in the length direction.

The rotatable connector device according to the present invention corresponds to the steering roll connector 10 in the embodiment; and similarly, the restriction sections correspond to the second diametrical direction restriction section 44a and the third diametrical direction restriction section 44c.

However, the present invention is not limited to the above-described embodiment, and can be carried out in many other embodiments.

REFERENCE SIGNS LIST

10 . . . Steering roll connector
20 . . . Rotator
21 . . . Rotatable-side ring plate
22 . . . Inner circumferential cylindrical section
30 . . . Stator
31 . . . Fixed-side ring plate
32 . . . Outer circumferential cylindrical section
40 . . . Retainer
45 . . . Rotatable roller
44a . . . Second diametrical direction restriction section
44c . . . Third diametrical direction restriction section
46 . . . Press guide
C, F . . . Flat cable
Cr, Fr . . . Reversed part
D . . . Dummy cable
Dr . . . Reversed part
S . . . Accommodation space

The invention claimed is:
1. A rotatable connector device, comprising:
a rotator including an annular rotatable-side ring plate and an inner circumferential cylindrical section having a cylindrical shape and formed along an inner circumferential edge of the rotatable-side ring plate; and
a stator including an annular fixed-side ring plate and an outer circumferential cylindrical section having a cylindrical shape and formed along an outer circumferential edge of the fixed-side ring plate;
wherein the stator and the rotator are in engagement with each other coaxially so as to be rotatable with respect to each other in a clockwise direction and a counterclockwise direction; and the rotatable-side ring plate and the inner circumferential cylindrical section of the rotator and the fixed-side ring plate and the outer circumferential cylindrical section of the stator form an accommodation space;

the rotatable connector device further comprising:
an annular retainer, for supporting a plurality of rotatable rollers, placed in a bottom part of the accommodation space;
at least one flat cable for electrically connecting the side of the rotator and the side of the stator to each other and including a reversed part at which a winding direction of the flat cable is reversed, the flat cable being accommodated on the retainer in the accommodation space such that the flat cable can be wound and rewound;
a flexible and elastic dummy cable having one end in a longitudinal direction thereof connected and fixed to the side of the rotator and the other end thereof connected and fixed to the side of the stator and including a reversed part directly wound along one of the rotatable rollers to reverse a winding direction thereof, the dummy cable being accommodated on the retainer in the accommodation space such that the dummy cable can be wound and rewound along the one of the rotatable rollers and being stacked on the flat cable;
a press guide, for allowing the reversed part of the dummy cable to be directly pressed thereon, provided on the retainer; and
diametrical direction restriction sections for restricting a movement in a diametrical direction of the dummy cable or the flat cable, the restriction sections being provided on the retainer and between the plurality of rotatable rollers located at an equal interval in a circumferential direction;
wherein:
the diametrical direction restriction sections include a first diametrical direction restriction section, a second diametrical direction restriction section and a third diametrical direction restriction section which have different shapes from each other;
the first diametrical direction restriction section stands close to a convex side of the reversed art of the dummy cable and is integral with the press guide;
the second diametrical direction restriction section stands close to another one of the rotatable rollers which is adjacent in the circumferential direction to the one of rotatable rollers along which the reversed part of the dummy cable is wound, with the first diametrical direction restriction section being interposed between these two rotatable rollers the second diametrical direction restriction section facing the first diametrical direction restriction section in the circumferential direction, with the another one of the rotatable rollers being interposed between the second diametrical direction restriction section and the first diametrical direction restriction section;
the third diametrical direction restriction section stands between the second diametrical direction restriction section and still another one of the rotatable rollers which is adjacent to the another one of the rotatable rollers close to the second diametrical direction restriction section, the still another one of the rotatable rollers being adjacent in the circumferential direction directed from the another one of the rotatable rollers close to the second diametrical direction restriction section toward the second diametrical direction restriction section, the third diametrical direction restriction section being close to the still another one of the rotatable rollers;
the dummy cable has a length in the longitudinal direction which is shorter than that of the flat cable in the longitudinal direction so as to allow the reversed part of the flat cable to be located at a substantially central position in the circumferential direction between the second diametrical direction restriction section and the third diametrical direction restriction section in the state where the reversed part of the dummy cable is wound along the one of the rotatable rollers; and the second diametrical direction restriction section and the third diametrical direction restriction section are away from each other by an interval which is larger than an interval between the one of the rotatable rollers along which the reversed part of the dummy cable is wound and the press guide and which is larger than or equal to a moving range by which the reversed part of the flat cable moves in the circumferential direction on the retainer in the vicinity of the one of the rotatable rollers until the retainer starts rotating after the rotator starts rotating.

2. A rotatable connector device according to claim 1, wherein:

the at least one flat cable includes two flat cables, and the dummy cable is wound while being interposed between the two flat cables;

one of the two flat cables is longer than the length of the dummy cable in the longitudinal direction, and the other one of the two flat cables is shorter than the length of the dummy cable in the longitudinal direction;

the diametrical direction restriction sections further include another second diametrical direction restriction section, another third diametrical direction restriction section, and a fourth diametrical direction restriction section;

the another third diametrical direction restriction section stands at a position facing the first diametrical direction restriction section in the circumferential direction with the one of the rotatable rollers along which the reversed part of the dummy cable is wound being interposed between the another third diametrical direction restriction section and the first diametrical direction restriction section;

the another second diametrical direction restriction section stands between the another third diametrical direction restriction section and yet another one of the rotatable rollers which is adjacent to the one of the rotatable rollers along which the reversed part of the dummy cable is wound, the yet another one of the rotatable rollers being adjacent in the circumferential direction opposite from the first diametrical direction restriction section, the another second diametrical direction restriction section being close to the yet another one of the rotatable rollers;

the fourth diametrical direction restriction section stands in an area between any two of the plurality of rotatable rollers adjacent to each other in the circumferential direction, where none of the first diametrical direction restriction section, the second diametrical direction restriction section, the third diametrical direction restriction section, the another second diametrical direction restriction section and the another third diametrical direction restriction section stands; and the other one of the flat cables is reversed at a substantially central position in the circumferential direction between the another second diametrical direction restriction section and the another third diametrical direction restriction section.

* * * * *